Oct. 27, 1959  C. K. LEONARD  2,910,636
REVERSIBLE ELECTRICAL AMPLIFIER CIRCUIT
Filed June 20, 1956  2 Sheets-Sheet 1

INVENTOR.
CULLMAN K. LEONARD
BY
ATTORNEYS

Oct. 27, 1959  C. K. LEONARD  2,910,636
REVERSIBLE ELECTRICAL AMPLIFIER CIRCUIT
Filed June 20, 1956  2 Sheets-Sheet 2
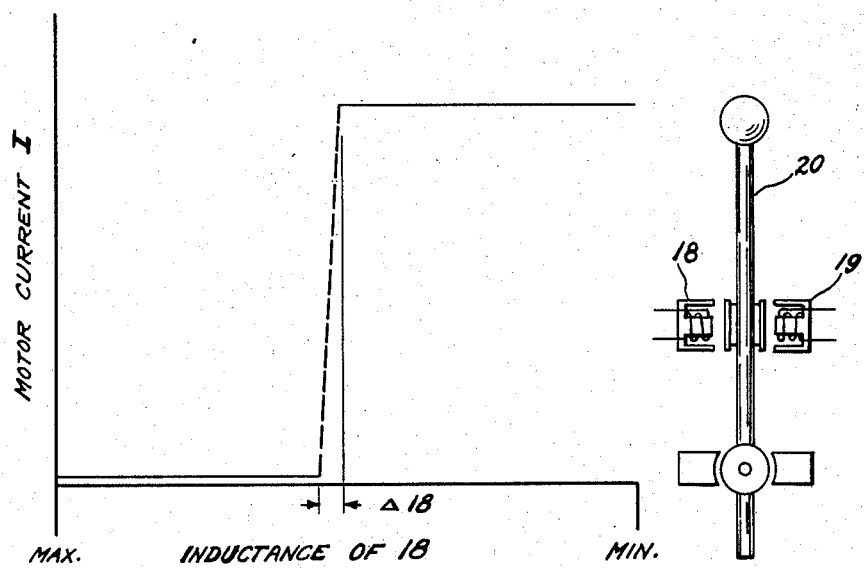
Fig. 3
Fig. 5
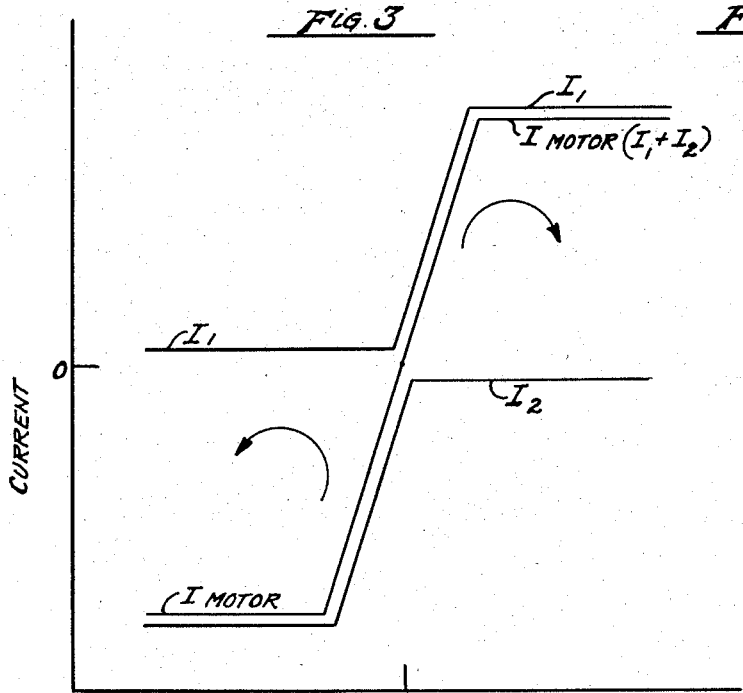
Fig. 4
INVENTOR.
CULLMAN K. LEONARD
BY
Martin J. Finnegan
ATTORNEYS

2,910,636

Patented Oct. 27, 1959

2,910,636

REVERSIBLE ELECTRICAL AMPLIFIER CIRCUIT

Cullman Kaye Leonard, Hamilton, Ohio, assignor to the United States of America as represented by the Secretary of the Air Force Application June 20, 1956, Serial No. 592,696

4 Claims. (Cl. 318—207)

This invention relates to an electrical amplifier circuit and more particularly to a bidirectional control for an alternating current servo motor.

The circuit provides bidirectional control of a two-phase alternating current servo motor used in aircraft control systems. A primary advantage of the circuit is high amplification without the use of commonly known power amplifier components such as electron tubes and magnetic amplifiers. This invention, therefore, provides means for avoiding, on the one hand, the problem of heavy duty power supplies needed when the control is of the electron tube type. On the other hand, the invention also avoids the rectification problems that are commonly a part of conventional magnetic amplifier systems. The decreased volume and weight which results from the use of this circuit is important in many situations as, for example, in aircraft application.

The motor control operates on the principle of establishing equal total impedance in each half of the circuit. Ambient temperature changes as well as frequency and voltage variations will influence each half of the circuit to the same degree, keeping the total impedances equal and thus minimizing drift of the control point from its desired zero setting.

The prior art shows conventional magnetic amplifiers utilized to control the delivery of energizing current to reversible motors. The present invention utilizes a series arrangement of cores and control inductances adapted to interact in a manner to bring about a similar result without the use of power amplifiers of the commonly known types such as electron tubes, magnetic amplifiers, or the like.

An object of the invention, therefore, is to provide a new and improved electrical system for controlling delivery of energizing power to reversible power-responsive devices.

Another object of this invention is to provide a new and improved electrical circuit to control speed and direction of two-phase alternating current servo motor.

A further object of this invention is to provide means of reducing system weight and complexity of existing equipment allowing more extensive utility especially in aircraft applications.

These and other advantages, features, and objects of the invention will become more apparent from the following description taken in connection with the illustrative embodiments in the accompanying drawings, wherein:

Fig. 3 illustrates the motor control characteristic;

Fig. 4 shows bidirectional control characteristic; and

Fig. 5 illustrates a pair of variable inductances suitable for the system of Figure 1.

Figure 1:
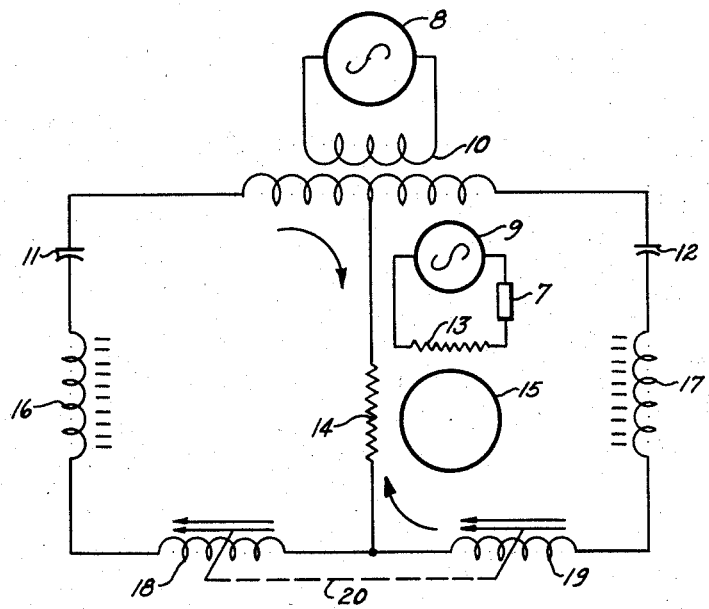
Fig. 1 shows the bidirectional control of a two-phase servo motor.

The circuit in Fig. 1 consists of a center-tapped power transformer 10, two capacitors 11 and 12, two special inductances having saturable cores 16 and 17, and two variable inductances 18 and 19. Alternating current source 8 is connected to power transformer 10 primary. A small two-phase alternating current servo motor 15 has motor control winding 14 and permanently excited motor winding 13 and alternating current source 9, which source may be the same as the control circuit source 8 if convenient. Also, in permanently excited motor winding 13 circuit is a phase shift controlling device 7 which is not of particular concern in the operation of this particular invention.

Figure 2:
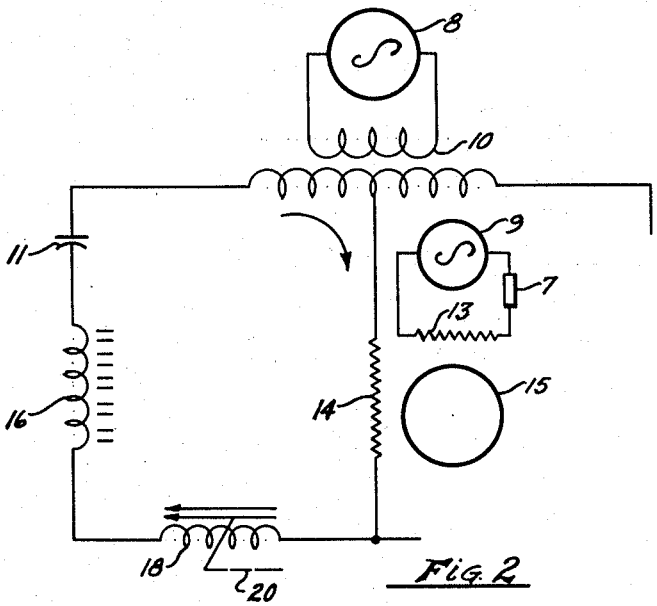
Fig. 2 illustrates unidirectional control of two-phase servo motor.

The theory of operation is best explained by using only one-half of the circuit which operates the motor in only one direction, Fig. 2. The inductance 16 is composed of a single coil wound on a core of magnetic material, the saturation curve of which is characterized by a very sharp knee. The unsaturated impedance of this inductance is several hundred times the saturated value.

The value of capacitance 11 is such that a near series resonant condition results when the saturable inductance 16 is operating on the saturated portion of its saturation curve and the variable inductance 18 is at some minimum value. The motor 15 is assumed to be stalled. For the circuit of Fig. 2, assume the variable inductance 18 to be set at some maximum value and the saturable inductance 16 operating well below the knee of its saturation curve. Since the saturable inductance 16 is in the unsaturated state, its impedance is very high and negligible current flows in the motor control coil 14. As the variable inductance 18 is decreased, the impedance of the saturable inductance 16 decreases. At some intermediate value of the variable inductance 18 the saturable inductance 16 reaches the knee of its saturation curve, the circuit approaches series resonance and the current increases sharply as the saturable inductance 16 goes into saturation. The resistance of the windings of the motor and the inductances sets the limit for the resulting motor current. The small inductance change of the variable inductance 18 as shown in Fig. 3 as $\Delta 18$ offers a steep control characteristic of motor current as a function of inductance of the variable inductance 18.

Combining the two halves of the circuit as in Fig. 1, the bidirectional control characteristic of Fig. 4 is provided. The vector resultant of $I_1$ and $I_2$, $I_1$ being the current flowing through variable inductance 18 and $I_2$ being the current flowing through variable inductance 19, constitutes the current to the motor control phase which regulates the current flow through motor control winding 14, Fig. 1. When the impedances of the two halves of the circuit are near series resonance, the current in the permanently excited motor winding 13 is ninety degrees out of phase with the current in the motor control winding 14. This satisfies the phase relationship necessary for maximum stalled motor torque in either direction. Thus, if the variable inductance 18 of Fig. 1 is less than the variable inductance 19, then the motor torque is clockwise as shown in Fig. 4. If the variable inductance 19 is less than the variable inductance 18, then the motor torque is counter clockwise. When the variable inductance 18 and the variable inductance 19 are equal the motor control current flowing through the motor control windings 14 is zero and hence the motor torque is zero. In practice, the movable core portions of each of the variable core inductances 18 and 19 are mechanically integrated with the link 20 so that an increase in the inductance effect of either of the units 18 or 19 is accompanied by a corresponding decrease in the inductance effect of the other.

The high gain of the circuit as shown in Fig. 2 is explained as follows: A small change of the variable inductance 18 when the circuit is near series resonance causes a sharp change in the motor control current flowing through the motor control winding 14. This change in motor control current causes the saturable inductance 16 to exceed the knee of its saturation curve and go into saturation. Thus, a small change in the variable inductance 18 causes the motor current to go from practically zero to its maximum value as limited by series circuit resistance.

The variable inductances 18 and 19 in Fig. 1 might be varied by a number of methods common among which are variable air gap and movable slub core. In either case, conventional amplifiers of low power level only are required for the purpose of translating a feeble input signal to a small magnetic core displacement.

Although the invention has been described with reference to particular embodiments, it will be understood to those skilled in the art that various changes and modifications can be made therein without departing from the invention. Thus, while the invention has been described and illustrated as applied to the control of a two-phase motor, it will be obvious that motors and other power-responsive devices, operable on either two-phase current or any alternative form of power supply, can be controlled by the principles of operations herein disclosed. I intend, therefore, to be limited only by the true spirit and scope of the appended claims.

Having thus described my invention, what I claim as new and desire to secure by Letters Patent of the United States is:

1. In an electric circuit comprising a source of alternating electromotive force, two variable inductance elements, two saturable inductance elements, and two capacitors in series across said source, said capacitors being for the purpose of placing said circuit in near series resonance for a critical value of said variable inductance elements, an electro-responsive device energized by said circuit, said device including an excitation winding forming part of said circuit, and means interposed between the junction of said inductance elements and a point of cyclically reversing polarity having a positive instantaneous polarity relative to one side of said source, and a negative instantaneous polarity relative to the other side of said source to produce flow of current of varying phase relationship, to control the operation of said electro-responsive device.

2. In an electric circuit for providing bidirectional control of a two-phase alternating current motor having a permanently excited field winding, the combination with said motor of a center tapped power transformer, the primary of said transformer being connected to an alternating current source, saturable core inductances serially connected through capacitors to the secondary of said power transformer, said motor having a control field winding connected to the center tap of said power transformer, variable core inductances serially connected between said control winding and said saturable core inductances, and means for varying the inductance properties of said variable core inductances in such manner that a small difference in the relative inductances causes the saturation of the corresponding saturable core inductance resulting in a sharp change of current flow through the motor control winding, and a correspondingly sharp amplification of the torque applied to said motor.

3. In an electric circuit wherein a plurality of variable core inductances operate to control the magnitude and direction of current flowing through the control windings of an electro-responsive device, the combination with said variable core inductances of a center tapped power transformer having its primary energized from an alternating current source, a corresponding plurality of saturable core inductances connected in series across the secondary of said transformer, and a plurality of capacitors connected in series between said saturable core inductances and secondary of said power transformer, said capacitors serving to provide the necessary capacitance for placing said circuit in near series resonance when one of said variable core inductances are placed at some minimum value and the saturable core inductance is in its saturated state, the center tap of said power transformer being connected to one terminal of the control winding of said electro-responsive device, the other terminal of the control winding of said electro-responsive device being connected to said variable core inductance, and means for varying the inductance properties of said variable core inductances in such manner that a small difference in the relative inductances causes the saturation of the corresponding saturable core inductance resulting in a sharp change of current flow through said control winding, and a correspondingly sharp amplification of the energy applied to said electro-responsive device.

4. In an electric circuit comprising a center tapped power transformer, the primary of said transformer being energized by a source of alternating electromotive force, the combination with said transformer of a pair of saturable core inductance elements each connected in series with one side of the secondary of said transformer through a corresponding pair of capacitors, said capacitors being for the purpose of placing said circuit in near series resonance for critical values thereof, means for varying the inductance in said circuit including a pair of variable core inductance elements connected in series between said saturable core inductance elements and one terminal of the control winding of an electro-responsive device, the other terminal of said control winding being connected to the center tap of said power transformer, and means interposed between the junction of said inductance elements and a point of cyclically reversing polarity having a positive instantaneous polarity relative to one side of said source, and a negative instantaneous polarity relative to the other side of said source to produce substantially total current flow of varying phase relationship through the control winding of said electro-responsive device as a consequence of a relatively small change in the inductive properties of the two variable core inductances thereby controlling the magnitude and direction of current flowing through said electro-responsive device.

References Cited in the file of this patent
UNITED STATES PATENTS

| | | |
|---|---|---|
| 2,260,122 | Moore | Oct. 21, 1941 |
| 2,390,463 | Roters | Dec. 4, 1945 |
| 2,473,791 | Doremus | June 21, 1949 |